(12) United States Patent
Aiso

(10) Patent No.: US 7,738,731 B2
(45) Date of Patent: Jun. 15, 2010

(54) IMAGE PROCESSING DEVICE, IMAGE PROCESSING METHOD, PROGRAM THEREOF, AND RECORDING MEDIUM

(75) Inventor: Seiji Aiso, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 960 days.

(21) Appl. No.: 10/578,635

(22) PCT Filed: Nov. 11, 2004

(86) PCT No.: PCT/JP2004/017128

§ 371 (c)(1),
(2), (4) Date: May 8, 2006

(87) PCT Pub. No.: WO2005/046221

PCT Pub. Date: May 19, 2005

(65) Prior Publication Data

US 2007/0133901 A1 Jun. 14, 2007

(30) Foreign Application Priority Data

Nov. 11, 2003 (JP) ............................. 2003-380614

(51) Int. Cl.
*G06K 9/36* (2006.01)
*G06K 9/32* (2006.01)
(52) U.S. Cl. .................. 382/284; 382/294; 382/299
(58) Field of Classification Search .................. 382/154, 382/284, 294, 299; 386/120
See application file for complete search history.

(56) References Cited

U.S. PATENT DOCUMENTS

| 5,696,848 | A | | 12/1997 | Patti et al. | |
| 5,999,662 | A | * | 12/1999 | Burt et al. | 382/284 |
| 6,650,361 | B1 | | 11/2003 | Shiomi | |
| 6,834,128 | B1 | * | 12/2004 | Altunbasak et al. | 382/284 |
| 7,376,249 | B2 | * | 5/2008 | Beun | 382/107 |
| 7,460,730 | B2 | * | 12/2008 | Pal et al. | 382/284 |
| 7,495,709 | B2 | * | 2/2009 | Abe | 348/586 |
| 2001/0010546 | A1 | * | 8/2001 | Chen | 348/218 |
| 2002/0051072 | A1 | * | 5/2002 | Sumitomo et al. | 348/362 |
| 2004/0225221 | A1 | * | 11/2004 | Olsson | 600/447 |

(Continued)

FOREIGN PATENT DOCUMENTS

EP 1 001 374 5/2000

(Continued)

OTHER PUBLICATIONS

Abstract of Japanese Patent Publication No. 2000-244851, Pub. Date: Sep. 8, 2000, Patent Abstracts of Japan.

(Continued)

*Primary Examiner*—Aaron W Carter
(74) *Attorney, Agent, or Firm*—Martine Penilla & Gencarella, LLP

(57) ABSTRACT

An image processing apparatus of the invention generates one still image having a high pixel density from multiple images. The image processing apparatus includes: an image extraction module that extracts the multiple images used for generation of the one still image; a deviation computation module that computes a degree of deviation between each combination of the extracted multiple images; an exclusion module that excludes any image having the computed degree of deviation out of a preset threshold range from the extracted multiple images; and an image composition module that combines remaining images other than the excluded image to generate the one still image. This arrangement of the invention ensures efficient image processing to generate one high-resolution still image from multiple images.

17 Claims, 10 Drawing Sheets

U.S. PATENT DOCUMENTS

| | | | |
|---|---|---|---|
| 2005/0013466 A1* | 1/2005 | Beun | 382/107 |
| 2005/0063598 A1* | 3/2005 | Sen et al. | 382/232 |
| 2005/0175235 A1* | 8/2005 | Luo et al. | 382/159 |
| 2007/0133901 A1* | 6/2007 | Aiso | 382/294 |

FOREIGN PATENT DOCUMENTS

| | | | |
|---|---|---|---|
| JP | 09-261526 | | 10/1997 |
| JP | 11-187307 | | 7/1999 |
| JP | 2000-152250 | | 5/2000 |
| JP | 2000-244851 | | 9/2000 |
| JP | 2002-112095 | | 4/2002 |
| JP | 2004-229004 | | 8/2004 |
| JP | 2004-234624 | | 8/2004 |
| JP | 2004-272751 | | 9/2004 |
| WO | WO98/02844 | * | 1/1998 |

OTHER PUBLICATIONS

Abstract of Japanese Patent Publication No. 2004-229004, Pub. Date: Aug. 12, 2004, Patent Abstracts of Japan.

Abstract of Japanese Patent Publication No. 2004-234624, Pub. Date: Aug. 19, 2004, Patent Abstracts of Japan.

Abstract of Japanese Patent Publication No. 2004-272751, Pub. Date: Sep. 30, 2004, Patent Abstracts of Japan.

Abstract of Japanese Patent Publication No. 09-261526, Pub. Date: Oct. 3, 1997, Patent Abstracts of Japan.

Abstract of Japanese Patent Publication No. 11-187307, Pub. Date: Jul. 9, 1999, Patent Abstracts of Japan.

Abstract of Japanese Patent Publication No. 2000-152250, Pub. Date: May 30, 2000, Patent Abstracts of Japan.

Abstract of Japanese Patent Publication No. 2002-112095, Pub. Date: Apr. 12, 2002, Patent Abstracts of Japan.

D. Chen and R. Schultz, "Extraction of High-Resolution Video Stills from MPEG Image Sequences," *Proc. IEEE Int'l Conf. on Image Processing*, vol. 2, 1998, pp. 465-469 (XP-010308640).

A. Stern et al., "Restoration and Resolution Enhancement of a Single Image from a Vibration-Distorted Image Sequence," *Opt. Eng.*, vol. 39, No. 9, Sep. 2000, pp. 2451-2457 (XP-001065017).

* cited by examiner

IMAGE PROCESSING DEVICE, IMAGE PROCESSING METHOD, PROGRAM THEREOF, AND RECORDING MEDIUM

TECHNICAL FIELD

The present invention relates to an image processing apparatus that generates one still image from multiple images and a corresponding image processing method, as well as a computer program and a recording medium that actualize the image processing method.

BACKGROUND ART

Image processing apparatuses and image processing methods have been proposed to combine multiple images and generate one high-resolution image. One known technique selects one scene from a moving image taken with a digital video camera and generates a higher-resolution still image (having a higher pixel density) than an original frame image of the selected scene. This prior art technique selects one frame image among (n+1) consecutive frame images as a reference image, calculates motion vectors of the other n frame images (subject images) relative to the selected reference image, and combines the (n+1) frame images based on the calculated motion vectors to generate one still image (see, for example, Japanese Patent Laying-Open Gazette No. 2000-244851). This image processing technique enhances the picture quality and increases the sharpness of the composite image, compared with the simple conversion of the resolution of one frame image.

DISCLOSURE OF THE INVENTION

The prior art image processing technique may, however, not always succeed in generating a high-resolution still image, while consuming a relatively long time for the image composition. For example, when one subject frame image has blur, the time-consuming image composition often gives only a still image of a relatively low resolution.

The object of the invention is thus to eliminate the drawbacks of the prior art technique and to ensure efficient image processing to generate one high-resolution image from multiple images.

In order to attain at least part of the above and the other related objects, the present invention is directed to an image processing apparatus that generates one still image having a high pixel density from multiple images. The image processing apparatus includes: an image extraction module that extracts the multiple images used for generation of the one still image; a deviation computation module that computes a degree of deviation between each combination of the extracted multiple images; an image selection module that selects at least two images among the extracted multiple images, based on the computed degrees of deviation; and an image composition module that combines the at least two selected images to generate the one still image.

There is an image processing method corresponding to the image processing apparatus. The image processing method generates one still image having a high pixel density from multiple images. The image processing method extracts the multiple images used for generation of the one still image, computes a degree of deviation between each combination of the extracted multiple images, selects at least two images among the extracted multiple images based on the computed degrees of deviation, and combines the at least two selected images to generate the one still image.

The image processing apparatus and the corresponding image processing method (hereafter collectively referred to as the image processing) computes the degree of deviation between each combination of the extracted multiple images and selects at least two images based on the computed degrees of deviation, prior to the actual image composition. The at least two images used for the image composition are selected according to the computed degrees of deviation. This arrangement of the invention ensures efficient processing for image composition.

In one preferable embodiment of the invention, the image processing specifies a reference image as a base of composition of the one still image and extracts the multiple images in a correlated order with the specified reference image.

The image processing of this embodiment extracts the multiple images, which are used to generate the one still image having the high pixel density, in the corrected order with the specified reference image. The multiple images used for the image composition are automatically extracted by specification of one reference image. This arrangement does not require specification of all the multiple images used for the image composition and simplifies the user's operation for image composition.

In the image processing of the invention, the multiple images may be consecutively arranged in time series, and the correlated order may be a time series order from the specified reference image. The multiple images may be extracted in various orders, for example, in an alternate order before and after the specified reference image or in an alternate order in time series from the specified reference image. Extraction of the images consecutively arranged in time series from the specified reference image desirably simplifies the image extraction process.

The image processing of the invention may display the number of images used for the image composition, prior to generation of the one still image. This arrangement enables the user to readily recognize the number of images actually used for the image composition. One possible modification may display the number of images excluded from the objects of image composition, in addition to or in place of the number of images used for the image composition.

The image processing of the invention may give an alarm when the number of the at least two selected images does not reach a preset minimal number, or may select either execution or non-execution of the image composition when the number of the at least two selected images does not reach a preset minimal number.

The first arrangement informs the user of the possibility that the generated one still image has insufficient sharpness since the number of images used for the image composition does not reach the preset minimal number. The second arrangement enables the user to select execution or non-execution of the image composition when the number of images used for the image composition does not reach the preset minimal number.

The image processing of the invention may discontinue the image composition when the number of the at least two selected images does not reach a preset minimal number.

Exclusion of the image having the computed degree of deviation out of a preset threshold range may decrease the number of images used for image composition to be less than the arbitrarily set minimal number, for example, two images or three images. The image processing of this arrangement discontinues the image composition in such cases. When generation of the still image having the high pixel density is not expected, the time-consuming image composition may thus be discontinued at an early stage. For example, setting a certain value to the minimal number enables immediate discontinuation of the image composition when even one of the computed degrees of deviation is out of the preset threshold range.

In another preferable embodiment of the invention, the image processing excludes any image having the computed degree of deviation out of a preset threshold range from the extracted multiple images, and selects images other than the image excluded by said exclusion module as the at least two images. Comparison between the computed degree of deviation and the preset threshold range enables the user to readily identify the image unsuitable for the image composition.

The computed degree of deviation may be at least either of a translational deviation between two images in a translational direction and a rotational deviation between the two images in a rotational direction. Any image having at least either of the translational deviation and the rotational deviation out of the preset threshold range may be excluded from the objects of image composition.

In the image processing of the invention, the preset threshold range may be set as specific values or may be expressed by a rate to a total number of pixels constituting the resulting still image. For example, the preset threshold range may be several to ten % of the number of vertical pixels and of the number of horizontal pixels. The preset threshold range may be fixed values. For example, the preset threshold range of the translational deviation may be ±16 pixels and the preset threshold range of the rotational deviation may be ±1°. Any image having at least either of the translational deviation out of ±16 pixels and the rotational deviation out of ±1° is excluded from the objects of image composition or causes discontinuation of the image composition. When the translational deviation between two consecutive images in time series is out of this threshold range, it is highly probable that one of the consecutive images has blur. Based on the result of the comparison between the translational deviation and the preset threshold range, any image expected to make substantially no contribution to the result of image composition is thus excluded from the objects of image composition or causes discontinuation of image composition.

In one application of the image processing of the invention, the multiple images may be multiple frame images included in a moving image. The technique of the invention is especially effective to combine multiple low-resolution frame images and generate one high-resolution still image.

In another application of the image processing of the invention, the multiple images may be multiple still images having information of an exposure time, which varies according to lightness of a photographic subject at a shooting time. The threshold range may be set for each still image, based on the varying exposure time.

This application sets the threshold range of the degree of deviation for each still image, based on the information of the exposure time of the still image at the shooting time. The concrete procedure calculates an allowable degree of deviation within the exposure time of one still image from the rate of the exposure time to the shooting time interval between two subject images, and sets the threshold range corresponding to the calculated allowable degree of deviation. In this application, the threshold range is not uniformly fixed but is adequately varied corresponding to each still image.

The technique of the invention may also be actualized by a computer program having any of the above arrangements and a recording medium in which such a computer program is recorded.

BEST MODES OF CARRYING OUT THE INVENTION

Figure 1:
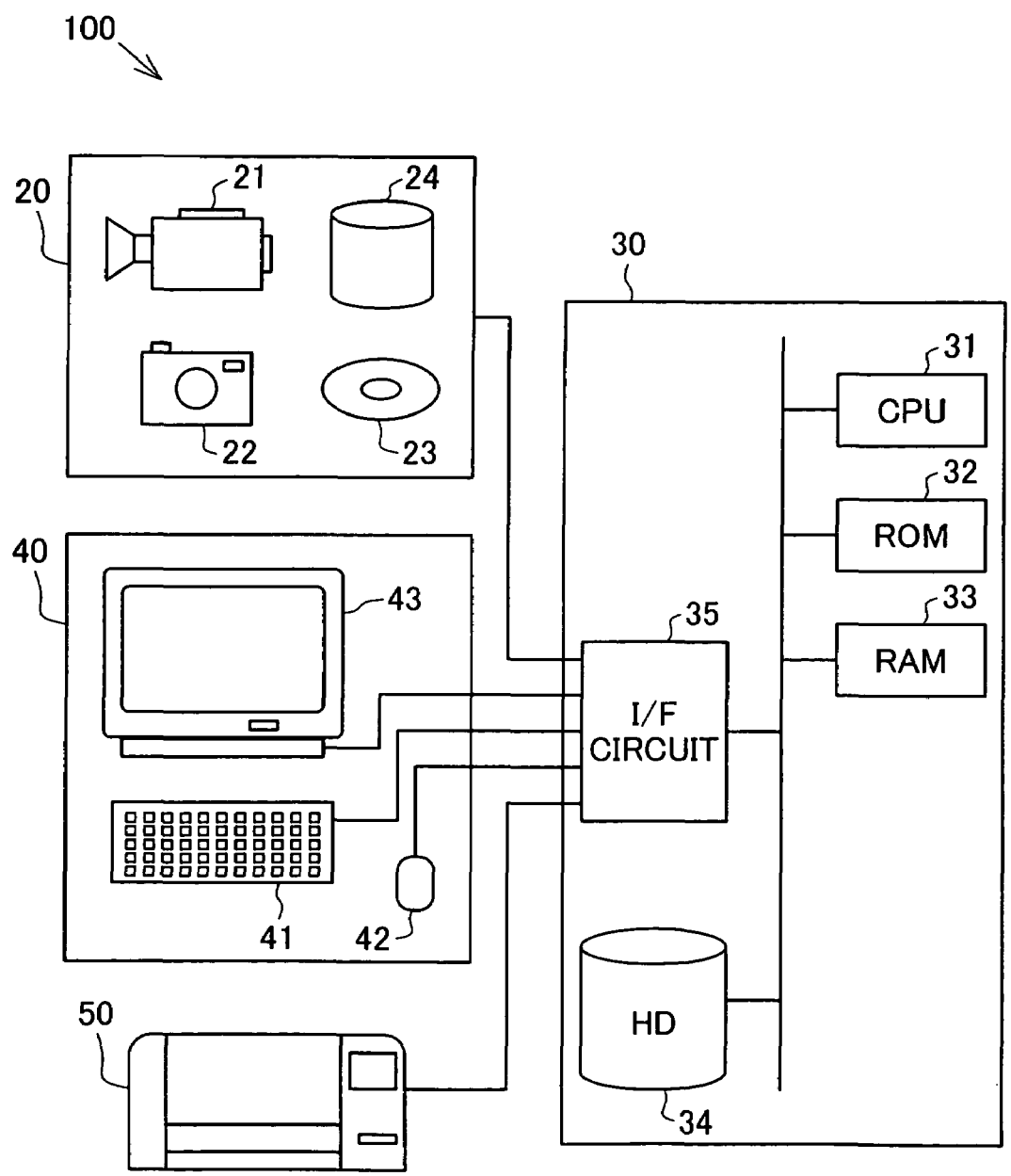
FIG. 1 schematically illustrates the configuration of an image processing system in a first embodiment of the invention.

Some modes of carrying out the invention are described below in the following sequence as preferred embodiments:
A. First Embodiment
A1. Configuration of Image Processing Apparatus
A2. Image Processing
A3. Computation of Deviation
A4. Setting Thresholds
B. Second Embodiment
B1. Image Processing
C. Third Embodiment
C1. Configuration of Image Processing Apparatus
C2. Image Processing
C3. Setting Thresholds A. First Embodiment A1. Configuration of Image Processing Apparatus FIG. 1 schematically illustrates the configuration of an image processing system 100 in a first embodiment of the invention. As illustrated, the image processing system 100 includes an image database 20 that supplies image data of moving images and still images, a personal computer 30 that functions as an image processing apparatus and performs series of image processing to process multiple images supplied from the image database 20, a user interface 40 that enables a user to give instruction for performing the series of image processing, and a color printer 50 that outputs a resulting processed image.

The image database 20 includes imaging devices and image storage devices that are capable of supplying image data to the personal computer 30. In the system of this embodiment, the image database 20 includes a digital video camera 21, a digital still camera 22, a DVD 23, and a hard disk 24. The image database 20 of the first embodiment stores moving image data taken with the digital video camera 21. In the description below, images processed by the image processing of this embodiment are referred to as frame images. The frame images represent multiple consecutive images sequentially arranged in time series and are part of a moving image.

The personal computer 30 includes a CPU 31 that executes the series of image processing, a ROM 32, a RAM 33, a hard disk 34 that stores an image processing software program installed therein, and an I/F circuit 35 that communicates with external devices, that is, the image database 20, the user interface 40, and the color printer 50. The image processing software program installed in the hard disk 34 is executed to combine multiple input frame images and generate one high-resolution still image. The personal computer 30 with the installed image processing software program comprehensively works as the image processing apparatus and has the functions of the 'image extraction module', the 'deviation computation module', the 'exclusion module', and the 'image composition module' of the invention. The flow of image processing will be described later in detail.

The user interface 40 includes a keyboard 41 and a mouse 42 that are manipulated by the user to perform the series of image processing, and a display 43 that displays multiple frame images before the image processing and a resulting still image as a result of image composition.

A2. Image Processing

Figure 2:
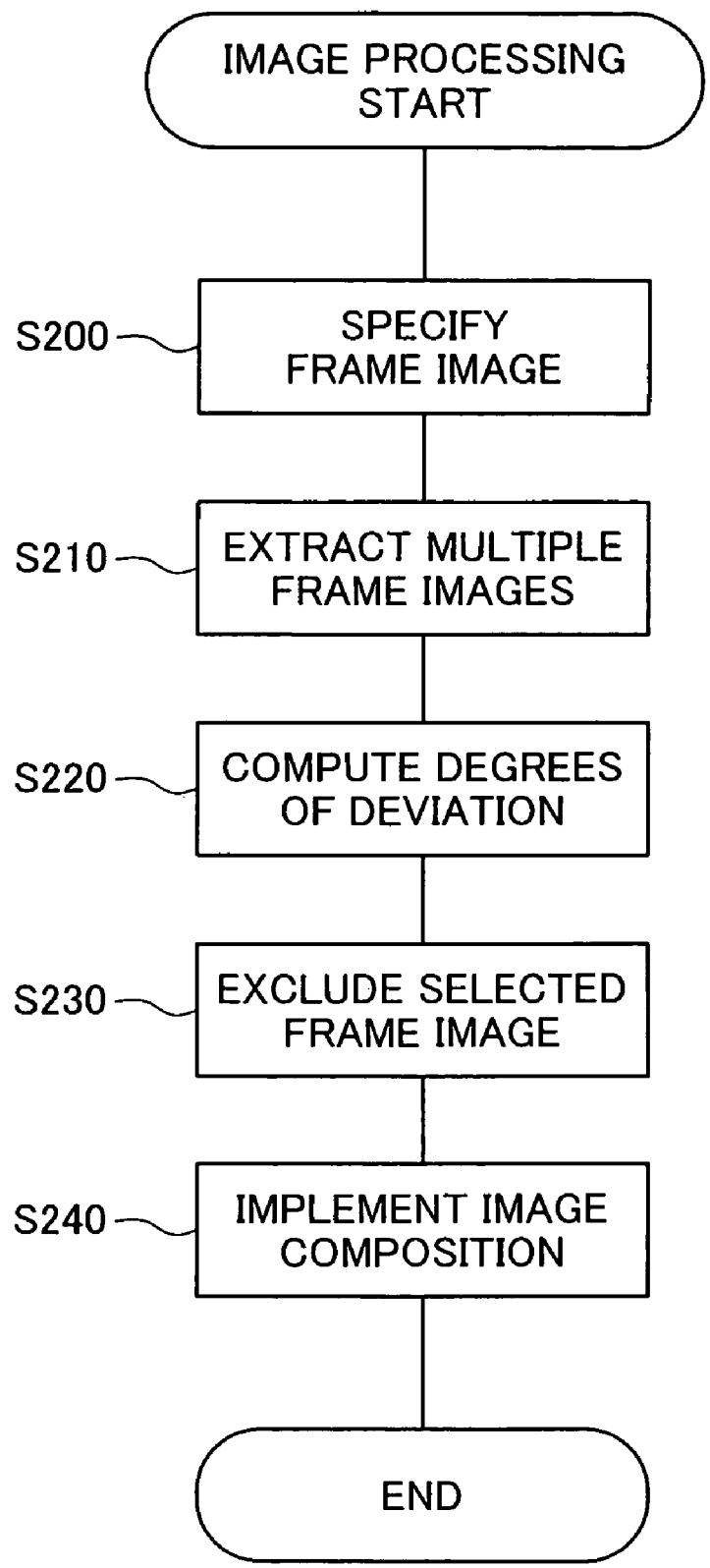
FIG. 2 is a flowchart showing an image processing routine executed in the first embodiment.

FIG. 2 is a flowchart showing an image processing routine executed in the first embodiment to combine multiple image data and generate one still image. In the image processing system 100 having the hardware configuration discussed above, the personal computer 30 starts the installed image processing software program, in response to the user's operation of the keyboard 41.

On a start of image processing, the personal computer 30 inputs moving image data as a set of frame image data from the image database 20 and plays back the input moving image data on the display 43. The user activates the suspend playback function to freeze the reproduced moving image at the user's desired scene for output of a still image. The personal computer 30 specifies the frozen scene (frame image) in response to the user's selection (step S200).

The personal computer 30 extracts the specified frame image and multiple consecutive frame images in time series after the specified frame image to be used for the subsequent image processing (step S210). The procedure of this embodiment extracts four consecutive frame images in time series from the user's operation timing for specifying the desired frame image. Among the four frame images, the user's specified frame image (that is, the first frame image in time series) is referred to as reference frame image F1, and the other three frame images are referred to as subject frame images F2 to F4. The user may arbitrarily set the number of frame images to be extracted.

Figure 3:
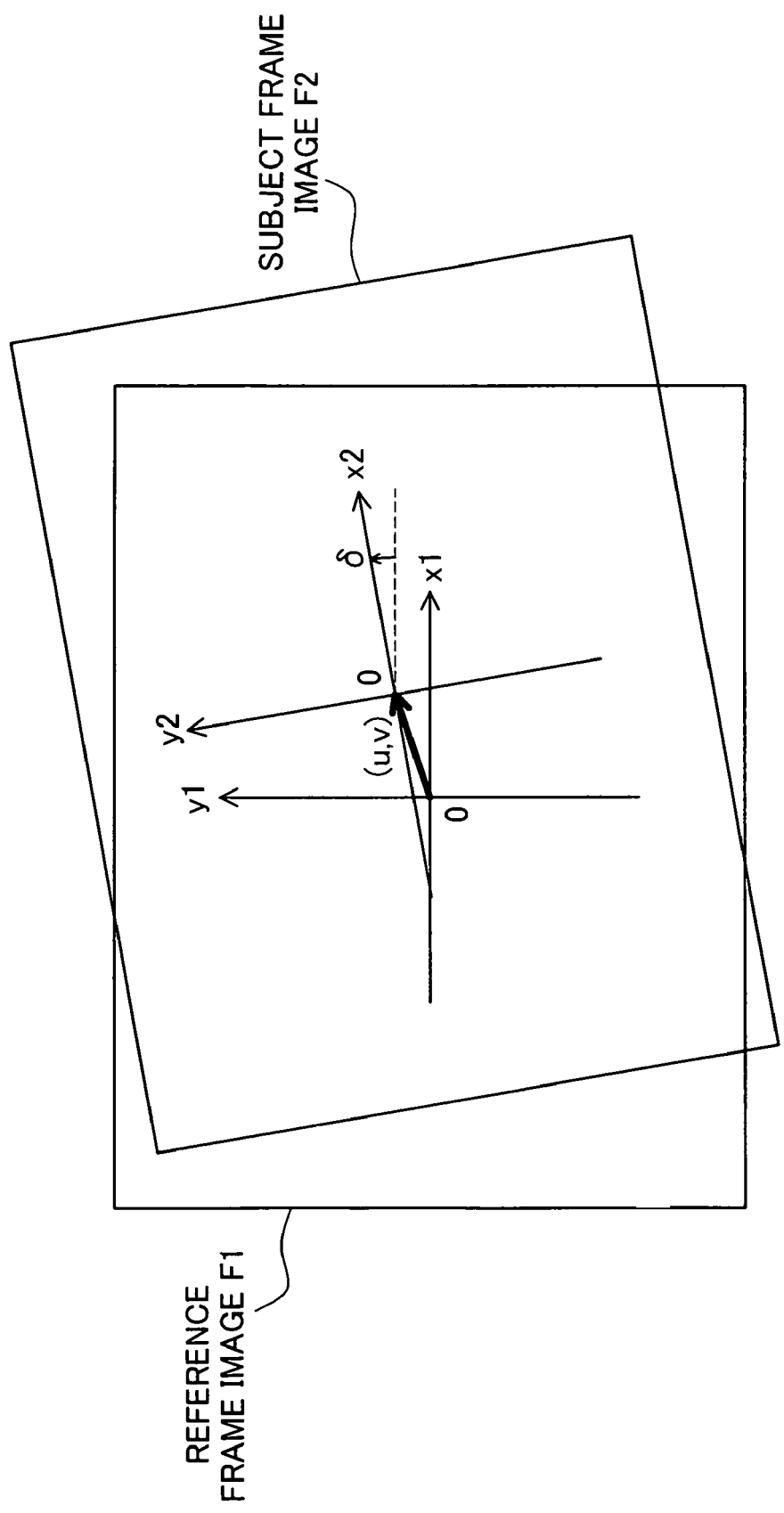
FIG. 3 shows positional deviation between two images.

The personal computer 30 then computes the degree of deviation between each pair of the extracted four frame images (step S220). The degree of deviation computed at step S220 is a 'positional deviation' between two images as shown in FIG. 3. The positional deviation is defined by three factors, translational deviations 'u' and 'v' in translational directions and a rotational deviation 'δ' in a rotational direction. The personal computer 30 computes the degree of deviation (u,v, δ) between every combination of the reference frame image F1 and the three subject frame images F2 to F4. The method of computing the degree of deviation will be described later in detail.

The personal computer 30 determines whether the computed degree of deviation between every combination of the four adjoining frame images in time series is within a predetermined range (defined by preset thresholds). For example, when the computed degree of deviation between the subject frame images F2 and F3 is out of the preset thresholds, an intentional quick pan of the digital video camera 21 is assumed between the subject frame images F2 and F3. It is thus highly probable that the subject frame image F3 has blur due to the quick camera pan. The personal computer 30 then excludes the subject frame image F3 having the high possibility of blur from objects of image composition (step S230).

The procedure of the embodiment sets a lower limit of the translational deviations 'u' and 'v' and compares the translational deviations 'u' and 'v' between every combination of the extracted four frame images with the lower limit. When both the degree of deviation between the adjoining subject frame images F2 and F3 and the degree of deviation between the adjoining subject frame images F3 and F4 are within the predetermined range, the subject frame images F2 and F4 may be substantially identical with each other. In such cases, these subject frame images F2 and F4 are not required simultaneously for image composition. Namely when two frame images have no significant deviation and are assumed to be identical, only one of the two frame images is sufficient for the image composition. The procedure of this embodiment sets 0.1 pixel to the lower limit of the translational deviations 'u' and 'v' between two frame images and excludes one of the two frame images from the objects of image composition when the computed translational deviations 'u' and 'v' are not greater than 0.1 pixel.

The personal computer 30 uses the non-excluded remaining subject frame images and the reference frame image F1 to implement image composition and generate a composite image (step S240). The concrete procedure of image composition lays a corrected subject frame image (for example, the subject frame image F2) after correction of the positional deviation over the reference frame image F1 and determines tone values of the respective pixels included in a resulting composite image from the tone values of the respective pixels in the reference frame image F1 and the subject frame image F2. The tone values of the respective pixels in the resulting composite image are determined by the known bilinear method, although another known method, such as the nearest neighbor method or the bicubic method may be adopted instead of the bilinear method. The personal computer 30 sequentially executes the image composition by the bilinear method to complete one composite still image.

The exclusion of the subject frame images based on the results of comparison with the preset thresholds may decrease the total number of the subject frame images used for the image composition. Even in such cases, the procedure of this embodiment performs the image composition with the remaining subject frame images and the reference frame image. The personal computer 30 displays the number of frame images eventually used for the image position on the display 43. The number of frame images used for the image composition may be displayed prior to execution of the image composition. One modified procedure may further extract a subsequent consecutive frame images (a fifth frame image) in time series from the image database 20 as an additional subject frame image and repeat the processing of and after step S220. This modified procedure keeps the fixed number of the subject frame images used for the image composition.

Another possible modification may extract a previous frame image before the reference frame image F1 in time series as an additional subject frame image.

The personal computer 30 displays the composite still image thus obtained in a selected position on the display 43 and concludes the image processing routine. The composite still image may be output to the color printer 20 or the hard disk 34 in response to the user's request.

The series of image processing excludes subject frame images making substantially no contribution to resolution enhancement and increased sharpness of a resulting composite image, for example, a subject frame image having a high possibility of blur and a subject frame image substantially identical with the reference frame image F1, from the objects of image composition, prior to execution of the image composition. This arrangement ensures efficient image processing.

A3. Computation of Deviation

As shown in FIG. 3, the positional deviation between the reference frame image F1 and the subject frame image F2 is expressed by the three parameters $(u,v,\delta)$. The reference frame image F1 is expressed in an orthogonal coordinate system $(x1,y1)$, where the center of the image is on the origin and $x1$ and $y1$ respectively denote a lateral axis and a vertical axis. The subject frame image F2 is expressed in an orthogonal coordinate system $(x2,y2)$, where the center of the image is on the origin and $x2$ and $y2$ respectively denote a lateral axis and a vertical axis. In the illustrated example of FIG. 3, the subject frame image F2 has a translational deviation 'u' in the lateral direction and a translational deviation 'v' in the vertical direction relative to the reference frame image F1 and a rotational deviation '$\delta$' in the rotational direction about the center of the subject frame image F2.

Figure 4:
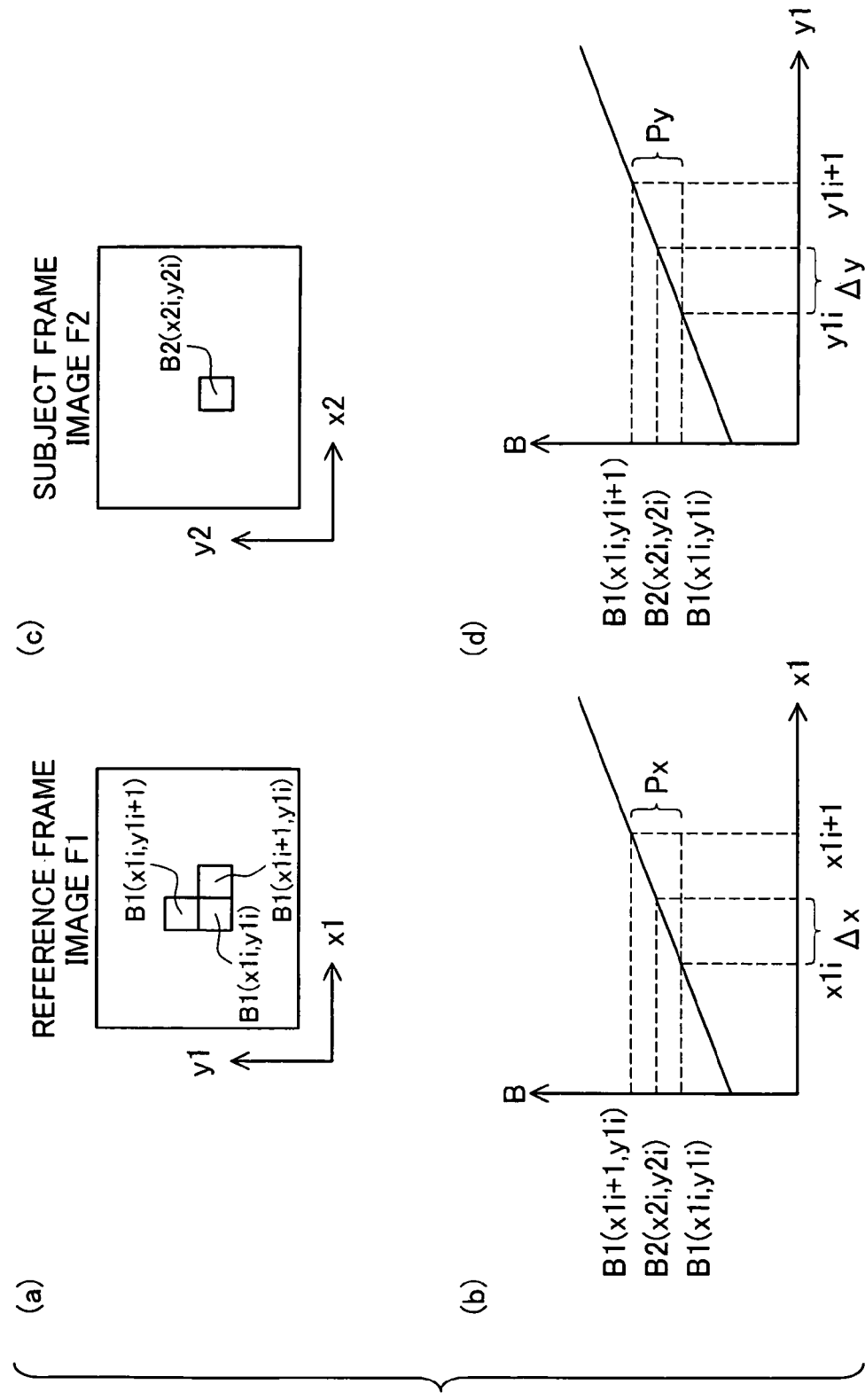
FIG. 4 shows a process of computing translational deviations by the gradient method.

The procedure of this embodiment adopts the gradient method, which uses luminance values of the respective pixels between each frame images and estimates a pixel position in a smaller unit than one pixel. FIG. 4 shows a process of computing translational deviations by the gradient method. FIGS. 4(a) and 4(c) show luminance values of pixels on the respective images, and FIGS. 4(b) and 4(d) show the principle of the gradient method. A certain pixel on the reference frame image F1 has coordinates $(x1i,y1i)$ and a luminance value $B1(x1i,y1i)$. A selected pixel having coordinates $(x2i,y2i)$ on the subject frame image F2 is located between the coordinates $(x1i,y1i)$ and coordinates $(x1i+1,y1i+1)$ on the reference frame image F1. The coordinates of the selected pixel on the reference frame image F1 are expressed as $(x1i+\Delta x, y1I+\Delta y)$.

As shown in FIGS. 4(b) and 4(d), when the pixel having the coordinates $(x2i,y2i)$ on the subject frame image F2 is assumed to be located at coordinates $(x1i+\Delta x,y1i)$ on the reference frame image F1 and Px is defined as Equation (1), Equation (2) given below is obtained:

$$Px=B1(x1i+1,y1i)-B1(x1i,y1i) \quad (1)$$

$$Px \cdot \Delta x=B2(x2i,y2i)-B1(x1i,y1i) \quad (2)$$

Equation (2) is written as Equation (3), where $B1(x1i,y1i)$ and $B2(x2i,y2i)$ are simply expressed as B1 and B2:

$$\{Px \cdot \Delta x-(B2-B1)\}^2=0 \quad (3)$$

Determination of $\Delta x$ satisfying Equation (3) gives a translational deviation of the subject frame image F2 in the x-axis direction. The concrete procedure computes $\Delta x$ of the respective pixels in the subject frame image F2 and averages the computed values $\Delta x$ as the translational deviation of the subject frame image F2 in the x-axis direction.

Similarly when the pixel having the coordinates $(x2i,y2i)$ on the subject frame image F2 is assumed to be located at coordinates $(x1i,y1i+\Delta y)$ on the reference frame image F1 and Px is defined as Equation (4), Equation (5) given below is obtained:

$$Py=B1(x1i,y1i+1)-B1(x1i,y1i) \quad (4)$$

$$Py \cdot \Delta y=B2(x2i,y2i)-B1(x1i,y1i) \quad (5)$$

Equation (5) is written as Equation (6), where $B1(x1i,y1i)$ and $B2(x2i,y2i)$ are simply expressed as B1 and B2:

$$\{Py \cdot \Delta y-(B2-B1)\}^2=0 \quad (6)$$

Determination of $\Delta y$ satisfying Equation (6) gives a translational deviation of the subject frame image F2 in the y-axis direction. The concrete procedure computes $\Delta y$ of the respective pixels in the subject frame image F2 and averages the computed values $\Delta y$ as the translational deviation of the subject frame image F2 in the y-axis direction.

Equation (3) regards only the x-axis direction and Equation (6) regards only the y-axis direction. Expansion of these equations to take into account both the x-axis direction and the y-axis direction gives:

$$S^2=\Sigma\{Px \cdot \Delta x+Py \cdot \Delta y-(B2-B1)\}^2 \quad (7)$$

The values of $\Delta x$ and $\Delta y$ that minimize Equation (7) are determined by the least squares method as the translational deviations 'u' and 'v'.

Figure 5:
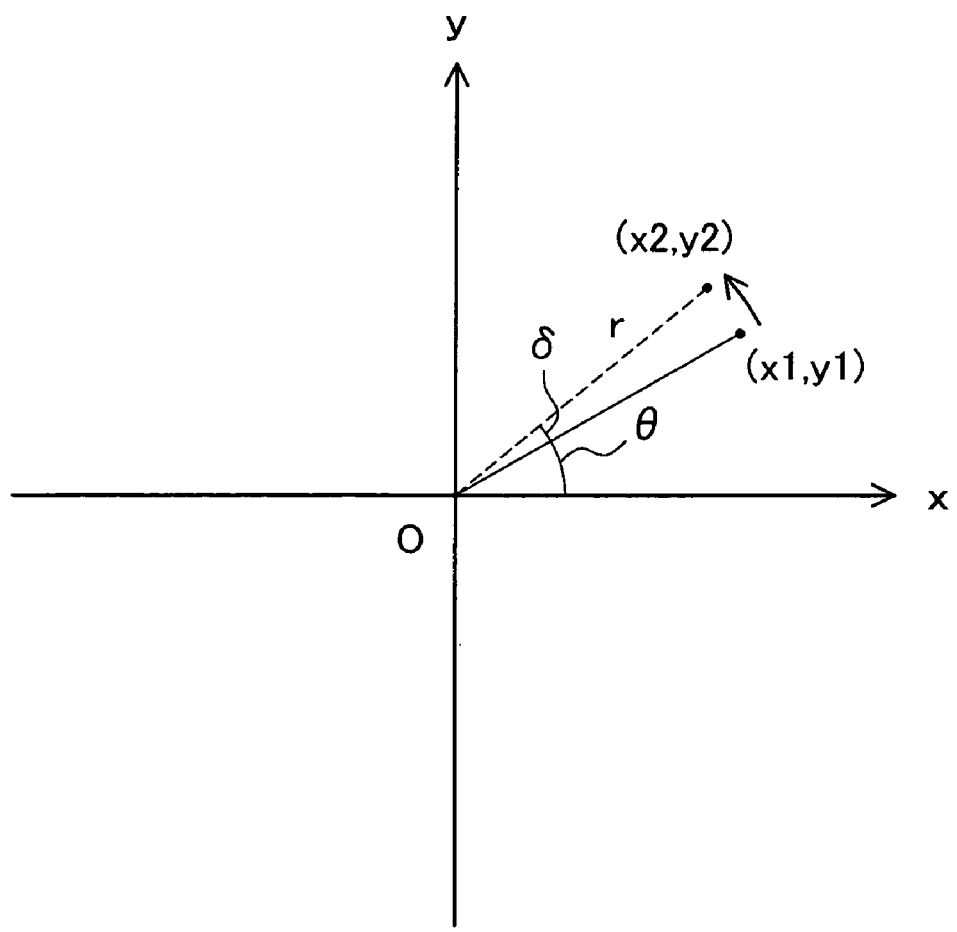
FIG. 5 schematically shows a rotational deviation of a pixel.

The above calculation is on the assumption that there is only a translational deviation between two frame images. The following description regards computation of the degree of deviation by additionally taking into account the rotational deviation $\delta$. FIG. 5 schematically shows a rotational deviation of a pixel. A distance 'r' of coordinates $(x1,y1)$ from the origin O on the reference frame image F1 and a rotational angle '$\theta$' of the pixel from the $x1$ axis are defined as:

$$r=(x^2+y^2)^{1/2} \quad (8)$$

$$\theta=\tan^{-1}(x/y) \quad (9)$$

In the illustrated example of FIG. 5, for the simplicity of explanation, the frame image has its center on the origin O and rotates about the origin O.

The rotation about the origin O shifts the coordinates $(x1, y1)$ on the reference frame image to $(x2,y2)$, which are identical with the coordinates $(x2,y2)$ on the subject frame image. A displacement $\Delta x$ in the x-axis direction and a displacement $\Delta y$ in the y-axis direction by this rotation are defined by:

$$\Delta x=x2-x1 \approx -r \cdot \delta \cdot \sin \delta = -\delta \cdot y1 \quad (10)$$

$$\Delta y=y2-y1 \approx r \cdot \delta \cdot \cos \delta = \delta \cdot x1 \quad (11)$$

On the assumption that the rotational deviation '$\delta$' is a minimal amount, the approximate expressions $\cos \delta \approx 1$ and $\sin \delta \approx \delta$ are applied.

By taking into account the rotational deviation '$\delta$' in addition to the translational deviations 'u' and 'v', the displacements $\Delta x$ and $\Delta y$ in Equation (7) are expressed as:

$$\Delta x=u-\delta \cdot y1 \quad (12)$$

$$\Delta y=v+\delta \cdot x1 \quad (13)$$

Substitution of the displacements into Equation (7) gives a general equation of:

$$S^2 = \Sigma\{Px \cdot (u - \delta \cdot y) + Py \cdot (v + \delta \cdot x) - (B2 - B1)\}^2 \quad (14)$$

Determination of the deviations 'u', 'v', and δ that minimize $S^2$ of Equation (14) by the least squares method accurately computes the degree of deviation of less than 1 pixel between two frame images. The embodiment adopts the gradient method for computation of the degree of deviation. Another technique, for example, the block matching method, the conjugate gradient method, and their combination, may be applied to compute the degree of deviation.

A4. Setting Thresholds

Figure 6:
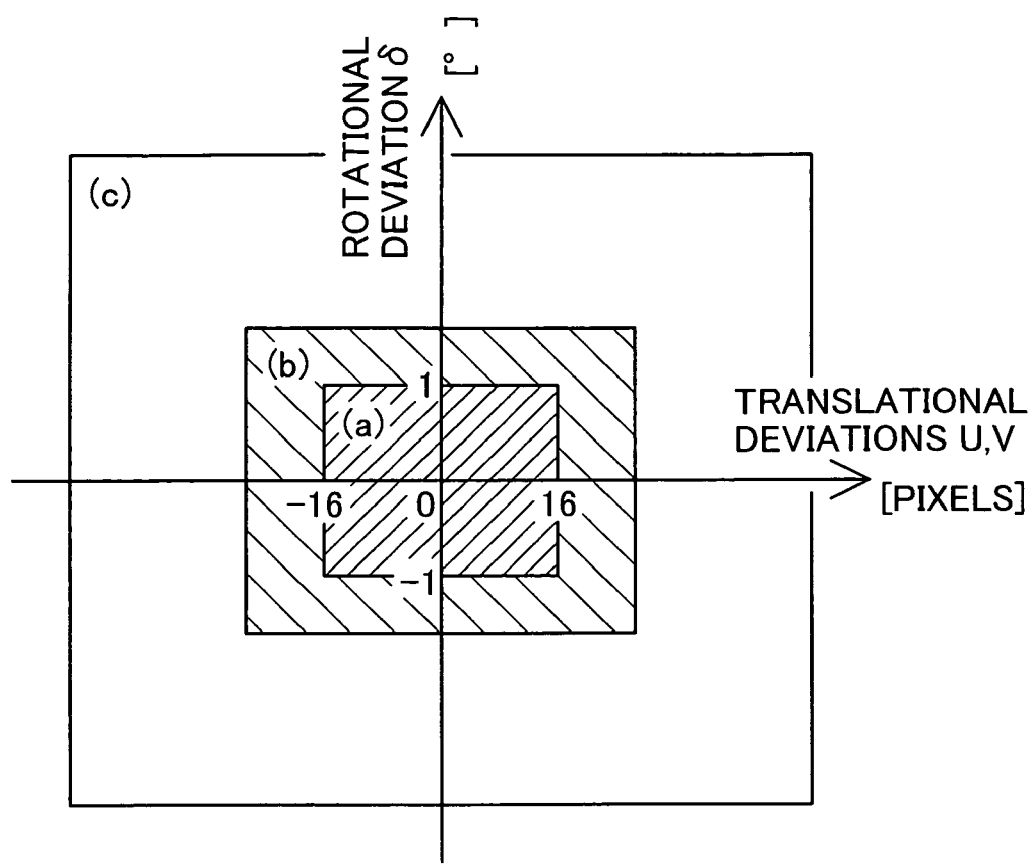
FIG. 6 shows a range contributing the increased sharpness of a resulting composite image relative to the computed degree of deviation.

The range (thresholds) contributing the resolution enhancement and the increased sharpness of a resulting composite image is set with regard to the degree of deviation (u,v,δ) computed as discussed above. FIG. 6 shows a range contributing the increased sharpness of a resulting composite image relative to the computed degree of deviation. The abscissa and the ordinate respectively show the translational deviations 'u' and 'v' and the rotational deviation 'δ', and areas (a), (b), and (c) are set to specify the range contributing the resolution enhancement and the increased sharpness. The area (a) represents a range of positional deviation between adjoining frame images caused by general hand movement or camera pan. The area (b) represents a range of positional deviation between adjoining frame images caused by a quick camera can or an intentional camera rotation. The area (c) represents a possible range of the translational deviations and the rotational deviation.

In this embodiment, the area (a) is set to satisfy conditions of $-16$ pixels $\leq$ translational deviations 'u', 'v' $\leq 16$ pixels and $-1° \leq$ rotational deviation 'δ' $\leq 1°$. When the computed degree of deviation between a subject frame image and the reference frame image is included in the area (a), the subject frame image is identified to contribute the increased sharpness of the resulting image. Namely ±16 pixels and ±1° are set as thresholds contributing the increased sharpness of the resulting image. The thresholds are fixed values in this embodiment, but may be varying values according to the conditions of a resulting composite image and the conditions of image composition. For example, the thresholds may be set as ratios (for example, several % or ten and several %) to the number of the horizontal pixels and to the number of the vertical pixels included in a resulting composite image. In another example, the thresholds may be set according to the optical magnification of an original moving image as the extraction source of frame images. The low optical magnification generally has a low potential for blur. The thresholds may be updated as a result of learning. The thresholds may be varied gradually, based on the user's judgment of composite images. The thresholds are raised upon the user's approval of the sharpness in a composite image, while being lowered upon the user's disapproval of the sharpness.

In a moving image taken with a conventional digital video camera, the positional deviation between adjoining frame images due to hand movement or camera pan typically includes the translational deviations of several pixels and the rotational deviation of not greater than 1°. Selection of frame images having the computed degrees of deviation within the area (a) effectively excludes subject frame images having significant blur, for example, due to a quick camera pan from the objects of image composition. Such selection also excludes subject frame images across scene transitions from the objects of image composition.

The rotational deviation 'δ' of the frame image included in the area (a) is within ±1°. This range satisfies the approximate expressions of $\cos \delta \approx 1$ and $\sin \delta \approx \delta$ introduced in the process of computing the degree of deviation. Namely this range ensures the sufficient computation accuracy of the degree of deviation. Selection of subject frame images included in the area (a) as the objects of image composition desirably excludes subject frame images that lower the computation accuracy of the degree of deviation.

B. Second Embodiment

B1. Image Processing

Figure 7:
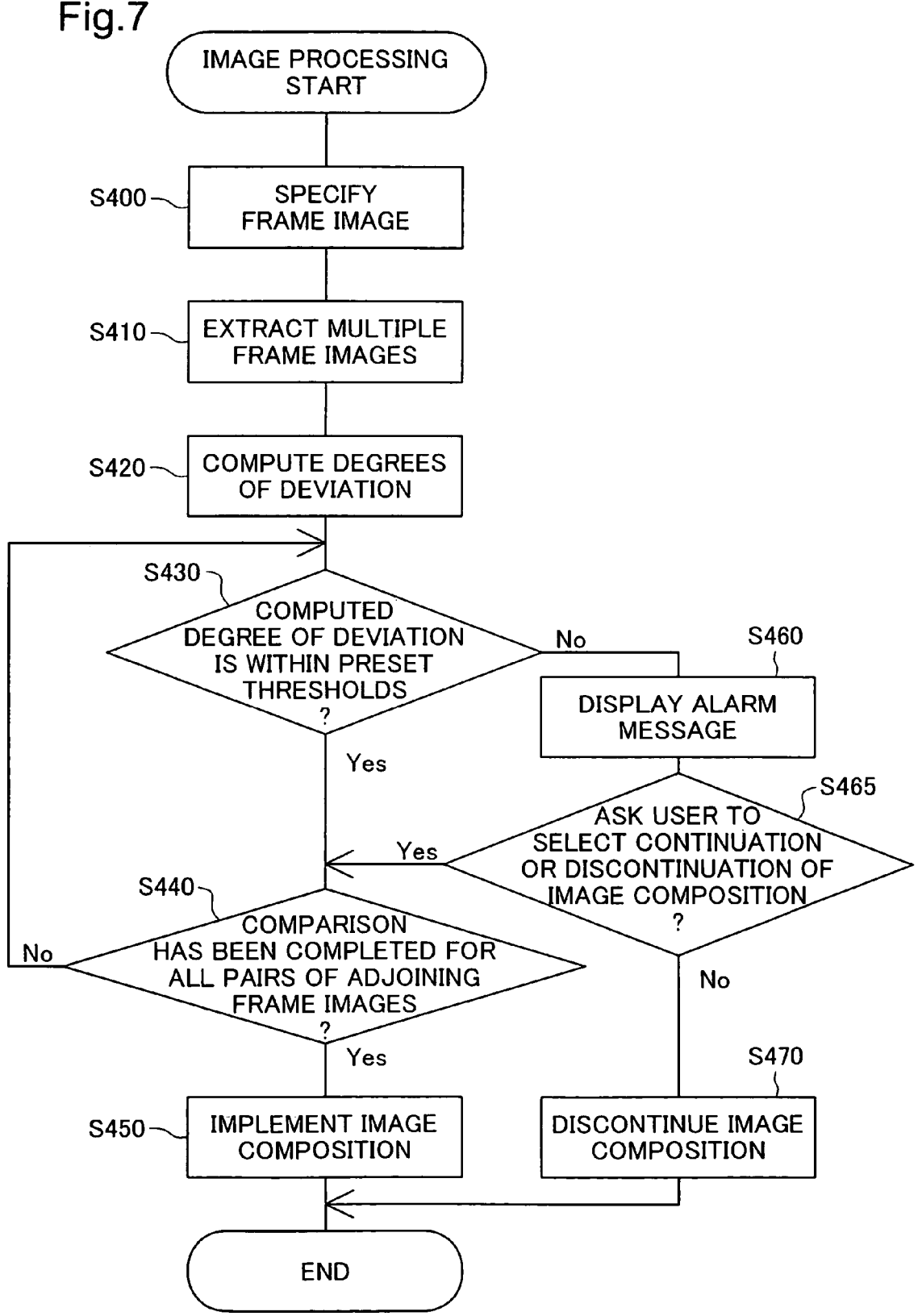
FIG. 7 is a flowchart showing an image processing routine executed in a second embodiment of the invention.

FIG. 7 is a flowchart showing an image processing routine executed in a second embodiment of the invention to combine multiple image data and generate one still image. The primary difference from the image processing of the first embodiment shown in the flowchart of FIG. 2 is a decision step for withdrawal of image composition. The identical processing steps with those of the first embodiment are not described in detail. The image processing system of the second embodiment has the hardware components that are identical with those of the first embodiment and are expressed by the same numerals and symbols and are thus not specifically described here.

When the image processing routine of this embodiment shown in FIG. 7 is triggered by the user's operation of the keyboard 41, like the first embodiment, the personal computer 30 first inputs moving image data from the image database 20, specifies a frozen frame image as a reference frame image F1 in response to the user's selection (step S400), and extracts three consecutive frame images in time series after the specified reference frame image F1 as subject frame images F2 to F4 (step S410).

Figure 8:
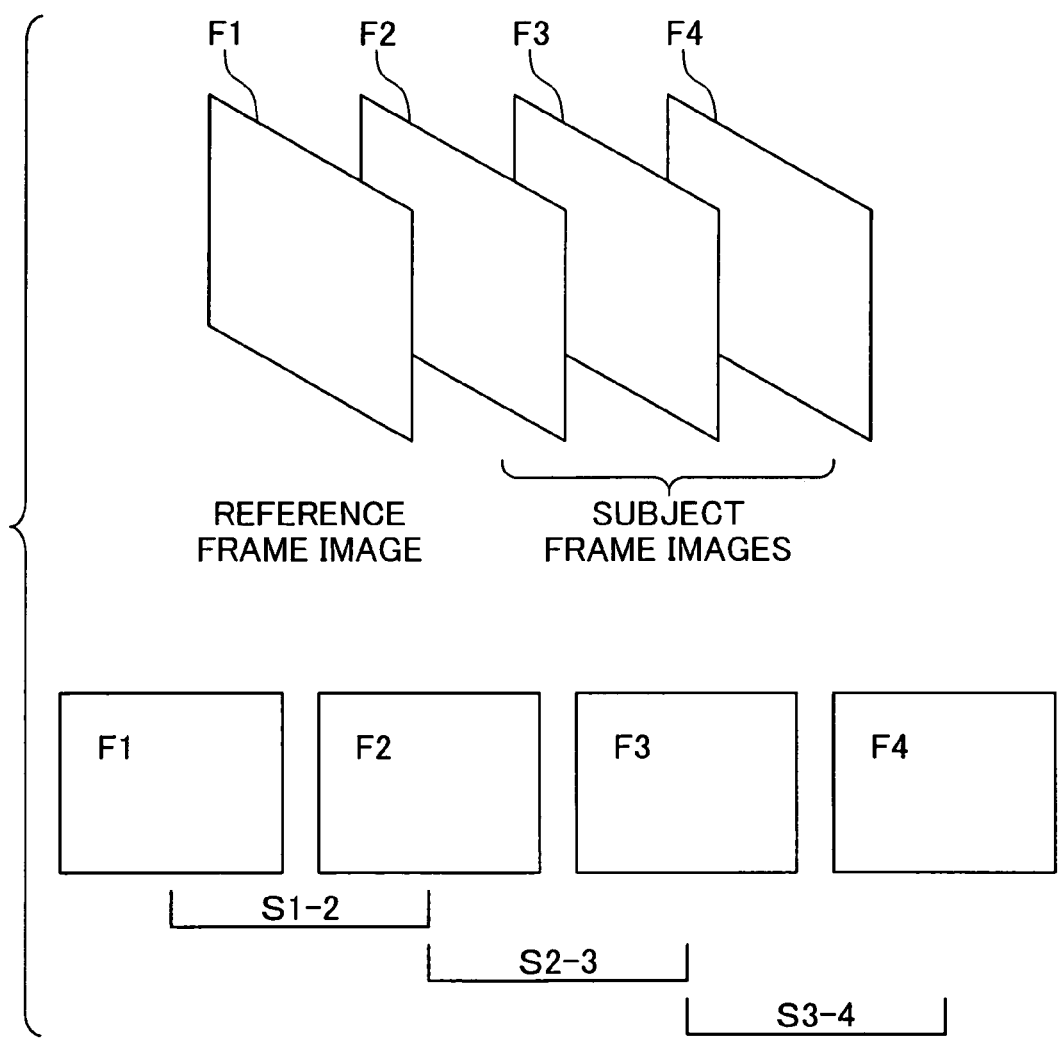
FIG. 8 shows a process of computing a degree of deviation in the second embodiment.

The personal computer 30 then computes the degree of deviation (u,v,δ) between each pair of the extracted four frame images (step S420). The deviation computation process adopts the method described in the first embodiment to compute the degree of deviation (u,v,δ) between every combination of the reference frame image F1 and the three subject frame images F2 to F4. In the description below, the computation of the degree of deviation between the reference frame image F1 and the subject frame image F2, the computation between the subject frame image F2 and the subject frame image F3, and the computation between the subject frame image F3 and the subject frame image F4 are respectively referred to as process S1-2, process S2-3, and process S3-4 as shown in FIG. 8.

The personal computer 30 subsequently determines whether the computed degree of deviation (u,v,δ) between one pair of adjoining frame images is within the preset thresholds described in the first embodiment (step S430). The concrete procedure first compares the computed degree of deviation (u,v,δ) by the process S1-2 with the preset thresholds at step S430. When the computed degree of deviation (u,v,δ) is out of the preset thresholds at step S430, the personal computer 30 displays an alarm message telling that image composition may result in an unsharp composite image, on the display 43 (step S460) and opens a selection window on the display 43 to enable the user to select continuation or discontinuation of image composition (step S465). In response to the user's selection of discontinuation of image composition at step S465, the personal computer 30 discontinues the image composition (step S470) and concludes the image processing routine of FIG. 7.

When the computed degree of deviation (u,v,δ) is within the preset thresholds at step S430 or when the computed degree of deviation (u,v,δ) is out of the preset thresholds at step S430 but the user selects continuation of image composition at step S465, the personal computer 30 determines whether the comparison between the computed degree of deviation (u,v,δ) and the preset thresholds has been completed for all pairs of adjoining frame images (step S440). When the comparison between the computed degree of deviation (u,v,δ) and the preset thresholds has not been completed for all the pairs of adjoining frame images, the image processing routine goes back to step S430 to determine whether the computed degree of deviation between a next pair of adjoining frame images is within the preset thresholds. Upon condition that the computed degree of deviation by the process S1-2 is within the preset thresholds, the procedure makes a comparison between the computed degree of deviation by the process S2-3 and the preset thresholds. Upon condition that the computed degree of deviation by the process S2-3 is within the preset thresholds, the procedure makes a comparison between the computed degree of deviation by the process S3-4 and the preset thresholds. In the course of this repetition, when any of the computed degrees of deviation dissatisfies the threshold condition, the personal computer 30 displays the alarm message (step S460) and opens the selection window to enable the user to select continuation or discontinuation of image composition (step S465).

When the comparison between the computed degree of deviation (u,v,δ) and the preset thresholds has been completed for all the pairs of adjoining frame images at step S440, the personal computer 30 implements the actual image composition (step S450). In the same manner as the first embodiment, the image processing routine of the second embodiment compares the translational deviations 'u' and 'v' between every combination of the extracted frame images with the preset lower limit, prior to the actual image composition. The comparison excludes the identical or substantially identical subject frame image with another frame image from the objects of image composition. In the same manner as the first embodiment, the personal computer 30 displays a composite still image on the display 43 and exits from the series of image processing.

The image processing of the second embodiment displays the alarm message and asks the user to select continuation or discontinuation of image composition, when the extracted frame images include any frame image making substantially no contribution to the resolution enhancement and the increased sharpness of a resulting composite image. This arrangement enables the user to readily identify the frame images expected to make a contribution to the increased sharpness of the composite image, and to select continuation of time-consuming image composition only for the frame images expected to make a contribution to the increased sharpness. This ensures efficient image processing. In the moving image taken with a digital still camera, it is generally improbable that a frame image adjoining to a frame image making contribution to the increased sharpness of a resulting composite image has an abrupt positional deviation. The procedure of the embodiment displays the alarm message when the computed degree of deviation between any pair of the adjoining frame images dissatisfies the threshold condition. The user can thus select continuation or discontinuation of image position at a relatively early stage of image composition. This characteristic enables establishment of an efficient image processing system.

The procedure of the second embodiment computes the degrees of deviation between all the pairs of adjoining frame images and then sequentially compares the computed degrees of deviation with the preset thresholds. One modified procedure may compute the degree of deviation between one pair of adjoining frame images and compare the computed degree of deviation with the preset thresholds. Only upon satisfaction of the threshold condition, the modified procedure computes the degree of deviation between a next pair of adjoining frame images. The procedure of the second embodiment displays the alarm message and discourages the user from continuing image composition, when any of the computed degrees of deviation is out of the preset thresholds. One modified procedure may set an allowable limit number of frame images for image composition, and may discontinue the image composition when the remaining number of frame images does not reach the allowable limit number. For example, when one frame image among extracted four frame images has the computed degree of deviation out of the preset thresholds, the modified procedure excludes this frame image and uses the remaining three frame images to implement image composition. When two or more frame images have the computed degrees of deviation out of the preset thresholds, the modified procedure discontinues the image composition.

C. Third Embodiment

C1. Configuration of Image Processing Apparatus

The image processing system in a third embodiment of the invention has the hardware components that are identical with those of the first embodiment and are expressed by the same numerals and symbols and are thus not specifically described here. The primary difference from the first embodiment is image data taken and stored in the image database 20 (that is, the material of image composition) as described below.

The image data treated in the third embodiment are multiple still image data taken in a continuous shooting mode of a digital still camera. Each still image data is obtained as an Exif image file, which includes JPEG image data and required pieces of shooting information, such as the date and time of shooting, the exposure time, and use or non-use of flash. In the continuous shooting mode of the digital still camera of this embodiment, the user's long depression of the shutter enables still images to be taken at intervals of $\frac{1}{30}$ seconds. The image database 20 stores at least four Exif files of still images taken at the intervals of $\frac{1}{30}$ seconds. The image data included in each image file is taken with the automatically varying exposure time according to the lightness of a photographic subject. This embodiment treats the still image data taken at the intervals of $\frac{1}{30}$ seconds, but the technique of the invention is also applicable to treat still image data taken in a standard continuous shooting mode, for example, at a rate of 4 or 9 images per second.

C2. Image Processing

Figure 9:
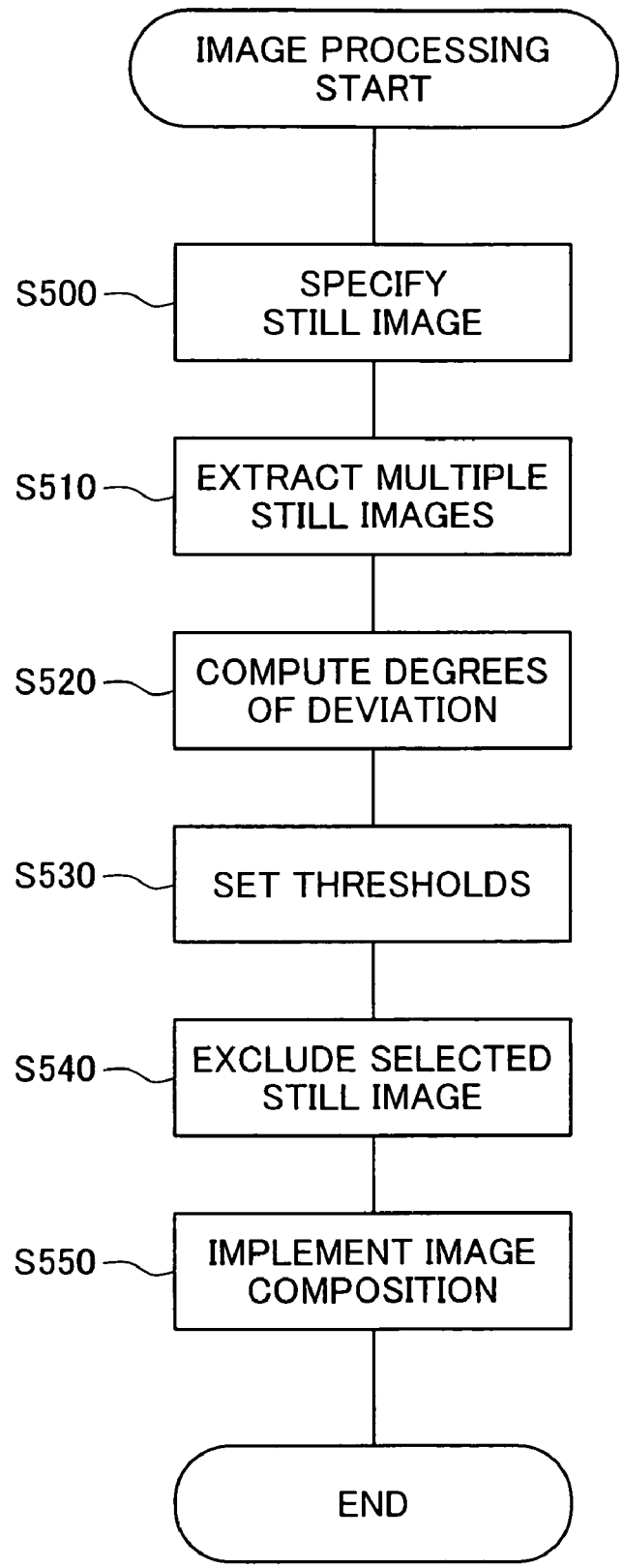
FIG. 9 is a flowchart showing an image processing routine executed in a third embodiment of the invention.

FIG. 9 is a flowchart showing an image processing routine executed in the third embodiment to combine multiple image data and generate one still image. In the image processing system of the above configuration, the image processing software program installed in the personal computer 30 is executed in response to the user's operation of the keyboard 41.

The personal computer 30 first reads multiple image files of multiple still images, which are taken in the continuous shooting mode, from the image database 20 and displays the multiple still images on the display 43. The user clicks and selects a desired still image among the still images on the display 43 with the mouse 42. The personal computer 30 specifies the selected still image in response to the user's instruction (step S500).

The personal computer 30 then extracts three consecutive still images in time series immediately after the specified still image out of the read still image files (step S510). The personal computer 30 subsequently computes the degree of deviation between each pair of the four still images (one specified still image and three extracted still images) (step S520) in the same manner as the first embodiment. For the purpose of distinction, in the description below, the specified still image is referred to as reference image and the extracted still images are referred to as subject images.

The personal computer 30 sets thresholds of the degree of deviation to identify the suitability of each subject image for image composition (step S530). Unlike the procedure of the first embodiment, the procedure of the third embodiment does not use the fixed thresholds but sets the thresholds for each subject image, based on the exposure time included in the shooting information of each image file. The method of setting the thresholds will be described later.

The personal computer 30 determines whether the computed degree of deviation between every combination of the four still images is within the preset thresholds according to the exposure time. The still images continuously shot with the digital still camera generally have significantly small rotational deviations 'δ'. The procedure of this embodiment thus compares only the computed translational deviations 'u' and 'v' with the preset thresholds. Based on the result of the comparison, the personal computer 30 excludes any subject image dissatisfying the threshold condition from the objects of image composition (step S540).

The personal computer 30 uses the non-excluded remaining subject images and the reference image to implement image composition and generate a composite image (step S550) in the same manner as the first embodiment. The personal computer 30 shows the resulting composite still image on the display 43 and exits from the series of image processing.

C3. Setting Thresholds

Figure 10:
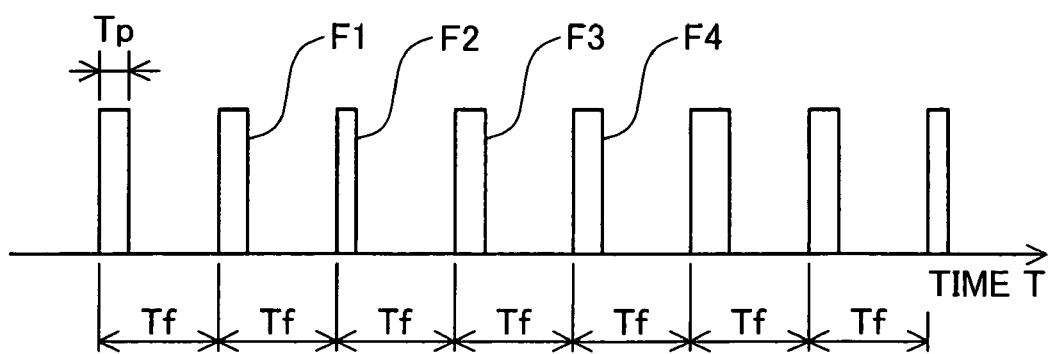
FIG. 10 shows the exposure time relative to the shooting period of still images taken in a continuous shooting mode.

FIG. 10 shows the exposure time relative to the shooting period of still images taken in the continuous shooting mode. Each of the still images F1, F2, F3, . . . continuously shot in time series at every shooting period Tf has a varying exposure time Tp. In this embodiment, the shooting period Tf is a constant interval of 1/30 seconds as mentioned previously, and the exposure time Tp varies for each still image.

The procedure computes the degree of deviation (u,v,δ) between the two consecutive still images F1 and F2 in time series. In the continuous shooting mode giving the significantly small rotational deviation 'δ', a moving distance 'mf' of the subject between the two adjoining still images is expressed as:

$$mf=(u^2+v^2)^{1/2} \quad (15)$$

where 'mf' denotes a moving distance within the shooting period Tf.

On the assumption that a moving distance 'mp' of the subject in one still image is proportional to the moving distance 'mf' of the subject between the two adjoining still images, the moving distance 'mp' of the subject in one still image is expressed as:

$$mp=mf \times Tp/Tf \quad (16)$$

When the moving distance 'mp' of the subject in one still image exceeds one pixel, there is a possibility that the still image has blur. When an allowable limit of blur is a predetermined value 'mpt' that is not greater than 1 pixel, the moving distance 'mf' of the subject between the two adjoining still images is expressed as:

$$mf=mpt \times Tf/Tp \quad (17)$$

A range satisfying this conditional expression is set to the thresholds of the degree of deviation (u,v,δ) between two still images.

The conditional expression (17) gives the narrower allowable range of the degree of deviation to still images having the longer exposure time Tp, while giving the wider allowable range to still images having the shorter exposure time Tp. This conditional expression (17) accordingly enables the adequate thresholds of the degree of deviation to be set for each of still images having different shooting conditions. Even when the shooting period Tf is not 1/30 seconds but is changed, setting the thresholds satisfying the conditional expression (17) enables selection of still images having a high potential for blur.

The procedure of this embodiment sets the thresholds for each still image based on the exposure time Tp and adequately excludes till images having a high potential for blur. This arrangement ensures efficient image processing. The procedure of the third embodiment excludes inadequate images from the objects of image composition like the first embodiment, but may be modified to enable the user to select continuation or discontinuation of image composition like the second embodiment.

The first through the third embodiments of the invention treat the consecutive images in time series as the material of image composition. The material of image composition is, however, not restricted to the consecutive images in times series but may be images taken from an identical angle on different dates or images taken simultaneously with two digital video cameras or two digital still cameras located near to each other. In the last case, even when the two cameras have relatively low resolutions, the image composition enables output of a high-resolution still image.

The embodiments and their modifications discussed above are to be considered in all aspects as illustrative and not restrictive. There may be many other modifications, changes, and alterations without departing from the scope or spirit of the main characteristics of the present invention.

In the systems of the embodiments described above, the personal computer is the image processing apparatus of the invention. The technique of the invention may also be attained by diversity of other devices, for example, printers, digital video cameras, and digital still cameras. The image processing apparatus and the corresponding image processing method of the invention may be actualized independently on the computer or may be incorporated in the diversity of other devices.

What I claimed is:

1. An image processing apparatus that generates one still image having a high pixel density from multiple images, said image processing apparatus comprising:
    an image extraction module that extracts the multiple images used for generation of the one still image;
    a deviation computation module that computes a degree of deviation between each combination of the extracted multiple images;
    an image selection module that selects at least two images among the extracted multiple images, based on the computed degrees of deviation, so that the computed degree of deviation is small to such an extent that the at least two images are regarded as those of the same subject; and
    an image composition module that combines the at least two selected images to generate the one still image having a resolution higher than that of any of the at least two images to be combined,
    wherein each of the modules of the image processing apparatus is executed by a microprocessor.

2. An image processing apparatus in accordance with claim 1, wherein said image extraction module has a specification module that specifies a reference image as a base of composition of the one still image, and said image extraction module extracts the multiple images in a correlated order with the specified reference image.

3. An image processing apparatus in accordance with claim 2, wherein the multiple images are consecutively arranged in time series, and the correlated order is a time series order from the specified reference image.

4. An image processing apparatus in accordance with claim 1, said image processing apparatus further comprising:

an image composition number display module that displays number of images used for image composition, prior to generation of the one still image.

5. An image processing apparatus in accordance with claim 1, said image processing apparatus further comprising:

an alarm module that gives an alarm when number of the at least two selected images does not reach a preset minimal number.

6. An image processing apparatus in accordance with claim 1, said image processing apparatus further comprising:

an execution selection module that selects either execution or non-execution of the image composition when number of the at least two selected images does not reach a preset minimal number.

7. An image processing apparatus in accordance with claim 1, said image processing apparatus further comprising:

a discontinuation module that discontinues the image composition when number of the at least two selected images does not reach a preset minimal number.

8. An image processing apparatus in accordance with claim 1, wherein said image selection module has an exclusion module that excludes any image having the computed degree of deviation out of a preset threshold range from the extracted multiple images, and said image selection module selects images other than the image excluded by said exclusion module as the at least two images.

9. An image processing apparatus in accordance with claim 8, wherein the computed degree of deviation is at least either of a translational deviation between two images in a translational direction and a rotational deviation between the two images in a rotational direction, and said exclusion module excludes any image having at least either of the translational deviation and the rotational deviation out of the preset threshold range.

10. An image processing apparatus in accordance with claim 9, wherein the preset threshold range is expressed by a number of pixels set as a rate to a total number of pixels constituting the one still image.

11. An image processing apparatus in accordance with claim 9, wherein the preset threshold range of the translational deviation is ±16 pixels and the preset threshold range of the rotational deviation is ±1°.

12. An image processing apparatus in accordance with claim 1, wherein the multiple images are multiple frame images included in a moving image.

13. An image processing apparatus in accordance with claim 8, wherein the multiple images are multiple still images having information of an exposure time, which varies according to lightness of a photographic subject at a shooting time, said image processing apparatus further comprising:

a threshold setting module that sets the threshold range for each still image, based on the varying exposure time.

14. An image processing method that generates one still image having a high pixel density from multiple images, said image processing method comprising the steps of:

extracting the multiple images used for generation of the one still image;

computing a degree of deviation between each combination of the extracted multiple images;

selecting at least two images among the extracted multiple images, based on the computed degrees of deviation, so that the computed degree of deviation is small to such an extent that the at least two images are regarded as those of the same subject; and combining the at least two selected images to generate the one still image having a resolution higher than that of any of the at least two images to be combined, wherein each step of the image processing method is executed by a microprocessor.

15. An image processing method in accordance with claim 14, said image processing method further comprising the step of:

discontinuing the image composition when number of the at least two selected images does not reach a preset minimal number.

16. An image processing apparatus that generates one still image having a high pixel density from multiple images, said image processing apparatus comprising:

an extraction unit that extracts the multiple images used for generation of the one still image;

an operator that computes a degree of deviation between each combination of the extracted multiple images, based on data of the multiple images;

a selector that selects at least two images among the extracted multiple images, based on the computed degrees of deviation, so that the computed degree of deviation is small to such an extent that the at least two images are regarded as those of the same subject; and an image composition unit that combines the at least two selected images to generate the one still image having a resolution higher than that of any of the at least two images to be combined, wherein the extraction unit, the operator, the selector, and the image composition unit are executed by a microprocessor.

17. A computer program product for generating one still image having a high pixel density from multiple images, said computer program product comprising a program code that is executed by a computer and a recording medium that records the program code so as to be read by the computer, wherein the program code includes:

a first program code of extracting the multiple images used for generation of the one still image;

a second program code of computing a degree of deviation between each combination of the extracted multiple images;

a third program code of selecting at least two images among the extracted multiple images, based on the computed degrees of deviation, so that the computed degree of deviation is small to such an extent that the at least two images are regarded as those of the same subject; and a fourth program code of combining the at least two selected images to generate the one still image having a resolution higher than that of any of the at least two images to be combined; and said recording medium stores said first to fourth program codes.

* * * * *